United States Patent
Anspon et al.

[15] 3,674,761
[45] July 4, 1972

[54] METHOD FOR THE PREPARATION OF ETHYLENE-CARBOXYLIC ACID COPOLYMERS

[72] Inventors: Harry D. Anspon, Sewickley, Pa.; Bert H. Clampitt; Ronald E. Gilbert, both of Overland Park, Kans.

[73] Assignee: Gulf Research & Development Company, Pittsburgh, Pa.

[22] Filed: Sept. 9, 1970

[21] Appl. No.: 70,899

Related U.S. Application Data

[63] Continuation-in-part of Ser. No. 694,046, Dec. 28, 1967, abandoned.

[52] U.S. Cl. ..................260/87.3, 156/327, 260/88.1 PC
[51] Int. Cl. .........................................................C08f 15/02
[58] Field of Search...................117/47, 118, 89.5 S, 87.3, 117/86.7; 260/89.5 S, 87.3, 86.7

[56] References Cited

UNITED STATES PATENTS

| | | | |
|---|---|---|---|
| 2,581,832 | 1/1952 | Blume | 260/91.3 |
| 2,649,439 | 8/1953 | Brown | 260/89.5 S |
| 3,485,785 | 12/1969 | Anspon | 260/29.6 |
| 3,567,488 | 3/1971 | Rathsack | 117/47 |
| 3,567,489 | 3/1971 | Rathsack | 117/47 |

*Primary Examiner*—Joseph L. Schofer
*Assistant Examiner*—C. A. Henderson, Jr.
*Attorney*—Richard L. Kelly, Carl A. Cline, Forrest D. Stine and Howard F. Van Denburgh

[57] ABSTRACT

An ethylene-carboxylic acid copolymer is prepared by the thermal decomposition of an ethylene-isopropyl ester of acrylic or methacrylic acid in the presence of controlled concentrations of water vapor or ammonia.

6 Claims, No Drawings

3,674,761

METHOD FOR THE PREPARATION OF ETHYLENE-CARBOXYLIC ACID COPOLYMERS

REFERENCE TO RELATED APPLICATIONS

This application is a continuation-in-part of application Ser. No. 694,046 now abandoned, filed Dec. 28, 1967.

BACKGROUND OF INVENTION

Ethylene-carboxylic acid copolymers are known in the art. Conventionally, they are prepared by the copolymerization of ethylene and a carboxylic acid employing a free-radical initiator either in the presence or absence of an inert solvent. In the preparation of these copolymers polymerization processes conventionally developed for the high-pressure synthesis of polyethylene are employed. Temperatures above 150° C. and pressures in the range of 50 to 3,000 atmospheres are employed in the polymerization reactor. Under such conditions, the acids employed are sufficiently corrosive to result in substantial damage to the high-pressure equipment under continuous operating conditions. Also, the concentration of unsaturated acid in the resulting product copolymer is limited by the solubility of the acid in the liquid organic medium employed in the high-pressure polymerizations.

Parent application Ser. No. 694,046 discloses the thermal decomposition of the ester groups of a copolymer comprising ethylene and an isopropyl ester of acrylic or methacrylic acid in the presence of steam or ammonia to produce an ethylene-acrylic acid polymer. It is known to the art that certain characteristics of ethylene-acrylic acid polymers are directly related to the molecular weight of such polymers. It is also known to the art that particular commercial applications employing such ethylene-acrylic acid polymers require polymers having particularly defined melt indices, illustrative of polymers having particular molecular weight distributions. It would be desirable in the preparation of ethylene-acrylic acid copolymers by the thermal decomposition of a copolymer comprising ethylene and an isopropyl ester of acrylic or methacrylic acid, to provide for a method of controlling the melt index of the product copolymer.

Therefore, an object of the invention is to provide an improved thermal decomposition process for the preparation of ethylene-carboxylic acid polymers from copolymers comprising ethylene and an isopropyl ester of acrylic or methacrylic acid.

Another object of the invention is to provide a thermal decomposition process for the preparation of ethylene-carboxylic acid copolymers having a controlled melt index.

Other objects, advantages and features of this invention will be readily apparent to those skilled in the art from the following description and the appended claims.

SUMMARY OF THE INVENTION

By the invention a copolymer comprising ethylene and an isopropyl ester of acrylic or methacrylic acid is heated to the ester thermal decomposition temperature in the presence of a controlled concentration of water vapor or ammonia, and an ethylene and acrylic or methacrylic acid polymer having a controlled melt index is recovered therefrom. The ester is converted to the acid form without causing degradation of the ethylene polymer chain into which the ester of the unsaturated acid is incorporated. The molecular weight of the ethylene-acrylic or methacrylic acid polymer produced by the thermal decomposition process is substantially lowered by increasing the concentration of steam and/or ammonia in the thermal decomposition zone.

DESCRIPTION OF THE INVENTION

Normally solid ethylene copolymers comprising ethylene and the isopropyl ester of acrylic or methacrylic acid and which are thermally decomposed by the process of this invention can be prepared by conventional methods known to the art. A suitable method is described in U.S. Pat. No. 3,350,372, wherein it is stated that ethylene and an alkyl acrylate (to include the isopropyl ester of acrylic or methacrylic acid) are copolymerized at pressures of the order of 10,000–40,000 psi and at temperatures of at least 200° F. The polymerization reaction can be conducted in the presence of a free-radical polymerization initiator and in the absence of any added solvent other than for minor quantities of catalyst carrier or telogenating agents.

Free-radical polymerization initiators employed in the copolymerization process can be selected from those normally employed in the homopolymerization of ethylene, such as the organic peroxides, e.g., lauryl peroxide, ditertiary butyl peroxide, and tertiary butyl peracetate, an azo compound such as $\alpha,\alpha'$-azobisisobutyronitrile and $\alpha,\alpha'$-azobisethylisobutyrate. Typically the free-radical polymerization initiator will be dissolved in a suitable organic liquid such as benzene, mineral oil or the like. Ordinarily, the free-radical initiator will be used at a level of the order of 50 to 20,000 ppm or preferably 100–250 ppm based upon the monomers charged to the reactor. The ethylene copolymers employed in the process of this invention can be random, block, or graft copolymers of ethylene and the isopropyl ester of acrylic or methacrylic acid.

Although it is within the scope of the invention to employ ethylene-isopropyl acrylate ester copolymers over a wide range of molar ratios of combined ethylene and isopropyl ester, the copolymers employed in the thermal decomposition process will normally contain a maximum of 0.5 mol of isopropyl acrylate ester per mol of contained ethylene. Normally the copolymers will contain at least 1 mol percent of the isopropyl acrylate ester.

The normally solid ethylene-isopropyl acrylate or methacrylate copolymer is heated to the ester decomposition temperature in the presence of water vapor (steam) or ammonia, or a mixture thereof, to obtain the product ethylene-acrylic or methacrylic acid copolymer. At atmospheric pressures, the ethylene-isopropyl acrylate or methacrylate copolymer is heated to a temperature of at least 325° C. Although some decomposition may occur at temperatures below 325° C., a complete decomposition of the ester groups in the polymer necessary to obtain the acid copolymer can be obtained only after exceedingly long heating times. Therefore, substantially lower decomposition temperatures are not commercially feasible. The copolymer is maintained at the decomposition temperature until the desired portion of the ester groups have been decomposed. The time required to achieve the desired thermal decomposition or pyrolysis of the ester radical will depend upon the temperature, decreasing with increasing decomposition temperatures.

It will be understood by those skilled in the art that the decomposition temperature can be adjusted by varying the pressure under which the thermal decomposition process step is performed. By employing superatmospheric pressures, decomposition temperatures above 325° C. are preferred while decomposition pressures substantially below atmospheric pressure will result in a somewhat lower thermal decomposition temperature.

The molecular weight distribution of the thermal decomposition product is controlled by adjusting the rate of flow of steam and/or ammonia to the thermal decomposition zone. It has been observed that the melt index of the ethylene-acrylic acid product can be raised by increasing the concentration of steam and/or ammonia in the thermal decomposition zone above the stoichiometric concentration (1 mol of steam and/or ammonia per mol of isopropyl ester of acrylic or methacrylic acid) required to convert the ester groups to the acid form. For example, when the starting ethylene-isopropyl acrylate ester copolymer is a 9.0 melt index polymer containing 19.1 weight percent of the isopropyl ester, the melt index of the product ethylene-acrylic acid copolymer can range from <1 to 550 by varying the concentration of steam in the thermal decomposition zone from 1 mol per mol of ester groups of the starting copolymer to 500 mols of steam per mol of ester.

A preferred method of conducting the thermal decomposition of the ethylene-isopropyl acrylate or methacrylate ester copolymer is to employ a conventional melt extruder operating at a temperature of at least 325° C. By this method, the ethylene-isopropyl acrylate or methacrylate ester copolymer can be passed directly from the polymerization reactor to the melt extruder and the product ethylene-acrylic or methacrylic acid copolymer recovered directly from the melt extruder.

The product ethylene-carboxylic acid copolymers of this invention can be employed in coating applications and find particular utility in the preparation of safety glass laminates wherein the ethylene-acrylic or methacrylic acid copolymers are employed as the inner layer.

The objects and advantages of the invention are further illustrated by the following examples. It is not intended, however, that the invention should be limited to the specific embodiments presented therein.

EXAMPLE I

This example demonstrates the effectiveness of the invention to produce a high molecular weight ethylene-acrylic acid copolymer by the thermal decomposition of an ethylene-isopropyl ester of acrylic acid copolymer. An ethylene-isopropyl ester of acrylic acid (containing 19.1 weight percent of the isopropyl ester) having a melt index of 9.0 is introduced at the rate of 1.5 pounds per hour into a 0.8 inch twin-screw extruder manufactured by Welding Engineers. Melt index, as the term is employed in this application, refers to test results obtained by employing ASTM–D–1238–62T.

The twin-screw extruder contains 6 temperature zones along the extruder barrel. The extruder was operated so as to maintain zone temperatures of 115° C., 360° C., 385° C., 380° C., 288° C., and 237° C., respectively, from the inlet to the outlet of the extruder. Steam was introduced into the barrel of the extruder at a rate so as to maintain a rate of steam feed comprising 1 mol of steam per mol of ester contained in the feed copolymer. The melt index of the ethylene-acrylic acid copolymer product obtained from the extruder was less than 1.

EXAMPLE II

The run of Example I was repeated with the exception that the rate of steam introduced into the extruder barrel was equivalent to 1.5 mols per mol of ester contained in the ethylene feed copolymer. The melt index of the ethylene-acrylic acid copolymer was 20.

EXAMPLE III

The run of Example I was repeated with the exception that the rate of steam introduced into the extruder barrel was equivalent to 2.5 mols of steam per mol of isopropyl ester contained in the feed copolymer. The melt index of the ethylene-acrylic acid product copolymer of this run was 41.

EXAMPLE IV

The run of Example I was repeated with the exception that the rate of steam introduced into the extruder barrel was equivalent to 500 mols of steam per mol of isopropyl ester in the starting copolymer. The melt index of the ethylene-acrylic acid copolymer product of this run was 550.

Although the invention has been described with reference to specific materials, embodiments and details, various modifications and changes, within the scope of this invention, will be apparent to those skilled in the art and are contemplated to be embraced in the invention.

What is claimed is:

1. In a process for the preparation of ethylene-carboxylic acid polymers which comprises heating an ethylene-isopropyl ester of acrylic or methacrylic acid copolymer to the ester decomposition temperature of at least 325° C., in the presence of one mol of gas per mol of isopropyl ester heated, said gas selected from the group consisting of steam and ammonia, maintaining said ethylene-isopropyl ester of acrylic or methacrylic acid at the thermal decomposition temperature until at least a portion of the isopropyl ester groups are decomposed, the ethylene concentration of the ethylene polymer to be heated being at least 2 mols per mol of contained isopropyl ester; the improvement which comprises increasing the concentration of said gas in the thermal decomposition zone to a mol ratio of greater than one and not more than 500 mols of said gas per mol of isopropyl ester and recovering an ethylene-carboxylic acid polymer having a higher melt index.

2. The process of claim 1 wherein the heating step is conducted in a melt extrusion zone.

3. The process of claim 1 wherein said acid is acrylic acid.

4. In a process for the preparation of ethylene-carboxylic acid polymers which comprises heating an ethylene-isopropyl ester of acrylic or methacrylic acid copolymer to the ester decomposition temperature of at least 325° C., in the presence of a gas selected from the group consisting of steam and ammonia, maintaining said ethylene-isopropyl ester of acrylic or methacrylic acid at the thermal decomposition temperature until at least a portion of the isopropyl ester groups are decomposed, the ethylene concentration of the ethylene polymer to be heated being at least 2 mols per mol of contained isopropyl ester; the improvement which comprises adjusting the rate of flow of gas to the heating zone responsive to the melt index of the ethylene-acrylic or methacrylic acid copolymer withdrawn from the heating zone while maintaining a concentration of greater than one and not more than 500 mols of said gas per mol of isopropyl ester in said heating zone.

5. The process of claim 4 wherein said gas is steam and wherein said rate of flow of gas to said heating zone is maintained in the range between 1 and 500 mols of steam per mol of isopropyl ester.

6. The process of claim 4 wherein the heating step is conducted in a melt extrusion zone.

* * * * *